(12) United States Patent
Neuvirth et al.

(10) Patent No.: US 11,652,833 B2
(45) Date of Patent: May 16, 2023

(54) DETECTION OF ANOMALOUS COUNT OF NEW ENTITIES

(71) Applicant: MICROSOFT TECHNOLOGY LICENSING, LLC, Redmond, WA (US)

(72) Inventors: Hani Hana Neuvirth, Redmond, WA (US); Dawn A. Burns, Redmond, WA (US); Andrey Karpovsky, Haifa (IL); Yotam Livny, Gadera (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 239 days.

(21) Appl. No.: 16/938,776

(22) Filed: Jul. 24, 2020

(65) Prior Publication Data

US 2022/0030019 A1    Jan. 27, 2022

(51) Int. Cl.
*H04L 9/40* (2022.01)
*G06F 16/2458* (2019.01)

(52) U.S. Cl.
CPC ...... *H04L 63/1425* (2013.01); *G06F 16/2477* (2019.01); *H04L 2463/121* (2013.01)

(58) Field of Classification Search
CPC .......................... H04L 63/1425; G06F 16/247
See application file for complete search history.

(56) References Cited

U.S. PATENT DOCUMENTS

| | | | |
|---|---|---|---|
| 7,363,656 B2 | 4/2008 | Weber et al. | |
| 8,245,294 B1 | 8/2012 | Zahra et al. | |
| 8,495,429 B2 | 7/2013 | Fu et al. | |
| 9,167,004 B2* | 10/2015 | Pappu | H04L 47/80 |
| 9,407,651 B2 | 8/2016 | Mathis | |
| 9,516,053 B1 | 12/2016 | Muddu et al. | |
| 10,341,391 B1* | 7/2019 | Pandey | H04L 67/14 |
| 10,601,844 B2 | 3/2020 | Parker | |
| 10,673,880 B1 | 6/2020 | Pratt et al. | |
| 2004/0193943 A1 | 9/2004 | Angelino et al. | |
| 2010/0071061 A1 | 3/2010 | Crovella et al. | |
| 2015/0256554 A1 | 9/2015 | Sakakibara et al. | |
| 2015/0304349 A1 | 10/2015 | Bernstein et al. | |
| 2016/0065603 A1* | 3/2016 | Dekel | H04L 63/1425 726/23 |
| 2016/0104091 A1* | 4/2016 | Fletcher | H04L 43/04 705/7.39 |

(Continued)

OTHER PUBLICATIONS

Patil (Looking for unknown anomalies—what is normal? Time Series analysis & its applications in Security, May 15, 2019, 11 pages) (Year: 2019).*

(Continued)

*Primary Examiner* — Oleg Korsak
(74) *Attorney, Agent, or Firm* — Newport IP, LLC; Han K. Gim

(57) ABSTRACT

An indication of a security alert and a context for the security alert is received. The context includes one or more entities related to the context and a timestamp for the security alert. Data sources for the one or more entities are searched during a time window around the timestamp. One or more anomaly detection models are executed to identify anomalies that are related to the security alert based on the context. Identified anomalies for investigation of the security alert are output.

19 Claims, 7 Drawing Sheets

(56) References Cited

U.S. PATENT DOCUMENTS

| | | | | |
|---|---|---|---|---|
| 2017/0063902 | A1* | 3/2017 | Muddu | H04L 41/22 |
| 2017/0093902 | A1 | 3/2017 | Roundy et al. | |
| 2018/0004948 | A1 | 1/2018 | Martin et al. | |
| 2020/0252417 | A1 | 8/2020 | Neuvirth et al. | |
| 2020/0285737 | A1* | 9/2020 | Kraus | G06F 21/552 |
| 2020/0310889 | A1* | 10/2020 | Levin | H04L 63/0263 |
| 2020/0311231 | A1* | 10/2020 | Levin | H04L 63/1425 |
| 2020/0320845 | A1* | 10/2020 | Livny | G06F 21/566 |
| 2020/0412750 | A1* | 12/2020 | Doron | H04L 63/1458 |
| 2021/0044606 | A1* | 2/2021 | Neuvirth | H04L 63/1433 |
| 2021/0157919 | A1* | 5/2021 | Stockdale | H04L 63/1433 |
| 2021/0194903 | A1* | 6/2021 | Medvedovsky | H04L 63/1433 |
| 2021/0203680 | A1* | 7/2021 | Das | H04L 63/20 |
| 2021/0288986 | A1* | 9/2021 | Myers | H04L 43/067 |
| 2021/0344691 | A1* | 11/2021 | Karpovsky | G06N 20/00 |
| 2022/0086179 | A1* | 3/2022 | Levin | H04W 12/63 |
| 2022/0086180 | A1* | 3/2022 | Karpovsky | G06N 7/005 |

OTHER PUBLICATIONS

"Notice of Allowance Issued in U.S. Appl. No. 16/265,742", dated Apr. 4, 2022, 10 Pages.

"Final Office Action Issued in U.S. Appl. No. 16/265,742", dated Oct. 26, 2021, 13 Pages.

"International Search Report and Written Opinion Issued in PCT Application No. PCT/US21/029519", dated Dec. 8, 2021, 10 Pages.

"Non Final Office Action Issued in U.S. Appl. No. 16/265,742", dated May 26, 2021, 12 Pages.

"International Search Report and Written Opinion Issued in PCT Application No. PCT/US2020/014534", dated Apr. 3, 2020, 24 Pages.

\* cited by examiner

DETECTION OF ANOMALOUS COUNT OF NEW ENTITIES

BACKGROUND

Computer networks are under constant threat from malicious parties seeking unauthorized access to the systems hosted thereon. The tactics used by malicious parties to attack networks and the tactics used by network administrators to defend against attacks are constantly evolving as the tactics are updated. New exploits are added to the arsenal of malicious parties and ineffective exploits are dropped. Implementing countermeasures, however, is often reactive, where network administrators must wait to identify the newest exploit before deploying a countermeasure and determining when to stop deploying a countermeasure when the corresponding exploit is no longer used. Correctly anticipating, identifying, and blocking the new exploits is crucial to maintaining security of a network. When targeting intrusion detection, most algorithms either target defined scenarios or utilize anomaly detection and unsupervised approaches.

It is with respect to these considerations and others that the disclosure made herein is presented.

SUMMARY

When using anomaly detection to identify attacks, an alert that is related to an entity of the computing such as a computer name or IP address and that indicates a potential anomaly is generated by the computing systems. In response, data sources that log information about the computing system are then subjected to anomaly detection to discover any anomalies and if they are of a malicious type.

The disclosed embodiments describe technologies that enable investigation of security alerts. An anomaly detection approach is disclosed for string columns with multiple possible values (i.e., non-categorical) that identifies anomalies in the number of new values per time period (e.g., per day), and determining if the anomalies list all the new values. The described technologies may be useful in a variety of situations where detection of anomalies is desired. In one example, the technologies may be useful for investigation scenarios, where the techniques can be used to identify an anomaly as well as suspicious entities, e.g. IPs, users or processes, rather than just to some related activity.

The described techniques may allow networks and data centers to provide improved security, more effectively adhere to operational objectives, and improve operating efficiencies. The described techniques may also be used, for example, for detecting anomalies in processes which can be useful in various contexts such as computing, information management, and so forth.

By providing the disclosed mechanism for identifying anomalies, potentially malicious attempts to access a system, loss of data and services may be avoided or mitigated, reducing downtime and impact to end users and providing for improved security and operational efficiency for computing networks and service providers.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1A:
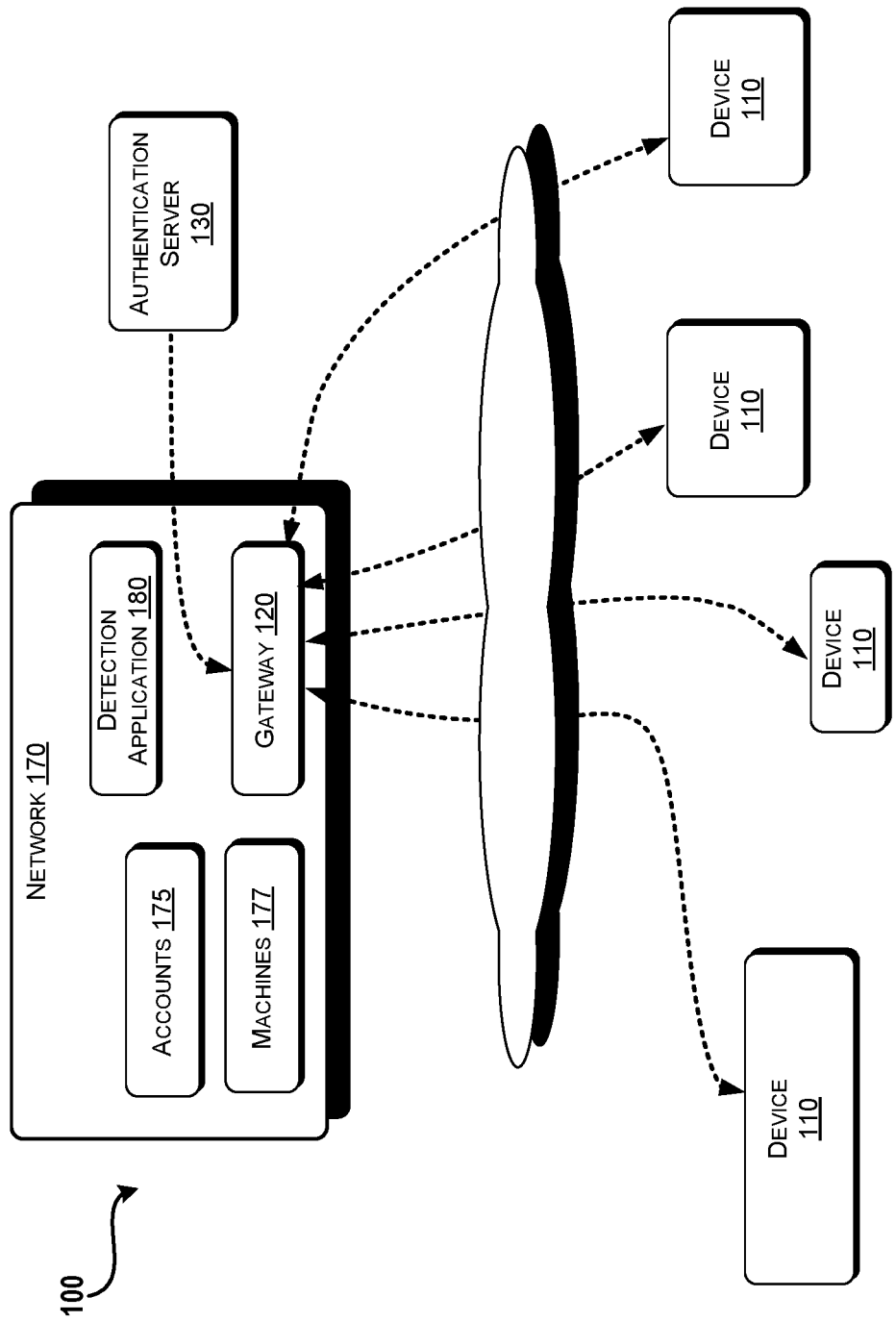
FIG. 1A is a diagram illustrating an example system implementing an anomaly detection function in accordance with the present disclosure.

Anomaly detection systems are used to detect anomalies in various computing systems. In a typical scenario, an alert may be generated that is related to an entity of the computing system. The entity may be a computer name or IP address, for example, and the alert may indicate that a potential malicious activity is present in the computing system. In response, data sources that log information about the computing system may then be subjected to anomaly detection to discover any anomalies and if they are of a malicious type.

In many computing systems, a human analyst is needed to investigate the alert to determine if there are any anomalies and if they are of the malicious type. This process can be time consuming if there are a large number of data sources to search when investigating the alert. This may also lead to expending a significant amount of time for the anomaly detection and an increased use of computing resources. In addition, it may also lead to an increased number of false positives that represent a loss of time and resources to investigate and confirm that the alert did not indicate an actual attack.

The embodiments disclosed herein provide a method for detecting potential anomalies in the data sources that are related to the entity of the alert while reducing false positives. Once a potential anomaly is detected, a process can be invoked to provide a notification as to the potential source or cause of the anomaly, which may greatly reduce the time and effort for the investigation of the alert. In addition, the lookup mechanism may be performed over one or more time windows that can help to increase the accuracy of the procedure, thus further reducing the number of false positives.

Upon investigating the alert, an investigator may determine which of the identified anomalies were caused by actual malicious activities and which ones are caused by random, non-malicious occurrences. The set of malicious anomalies may show patterns of behavior by entities that are indicative of malicious activity. In some embodiments, anomalies that have been determined to be indicative of a pattern of malicious behavior may be used to search for new detection or alert leads in subsequently received data.

In larger settings, an organization such as a security operation center (SOC) may be responsible for computing and network security of the organization, which may include detection, investigation, and remediation of threats as well as the ongoing management of security protection and monitoring of the various systems. An enormous amount of data logs is collected from these systems along with intrusion detection devices. Tools for collecting and analyzing these logs typically target detection and investigation challenges separately. An alert fatigue problem may result from the large number of false positive (FP) cases that the analysts deal with when monitoring alerts. This phenomenon is largely a result of considering anomalies to be equivalent to security detections.

Since actual attacks are rare and difficult to identify, labels can be scarce. Additionally, the adversarial nature of the domain requires detecting new attacks that continuously emerge. While this approach might have been useful for small, tightly restricted systems, switching to large-scale systems such as those implemented in the cloud can make this approach unscalable and ineffective. One reason lies in the Multiple Hypotheses Testing problem, where repeatedly testing for a hypothesis at the same significance threshold will randomly trip the threshold of significance if tested often enough. To utilize anomaly detection for security detection, the detection process needs to run continuously at the scale of the system. Thus, even relatively high-quality detections are deemed to raise a large number of false positive alerts. In extreme cases, since anomalies are in fact common in large scale systems, the lack of a security context may result in systematic errors generating large amounts of false positives. Fusion approaches for combining multiple weak signals and anomalies eventually fail as the scale continues to grow. Studies that focus on directly identifying attacks' patterns, rather than deviations from normal activity, effectively limit the search space, thus avoiding these problems.

An analyst's investigation can be split into two tasks: sifting through vast amounts of log records to identify data that is potentially related to an attack, and interpreting these logs to find evidence of malicious activity, also referred to as Indicators of Compromise (IoCs). Rather than the detection stage, anomaly detection may be better utilized in the investigation stage, by querying for anomalies only on entities for which alerts with a well-established security context have been raised. In this way the security context is established, and the number of queries (i.e., hypotheses being tested) is smaller, thus addressing the two issues noted above.

This approach, which may be referred to herein as AnomalyLookup (AL), supports the log-sifting task of the investigation, leading the analyst to the suspicious log records for interpretation. For a given alert timestamp and the entity on which it was raised (e.g. user, machine, IP address, etc.), the AL approach searches through the raw data to find all the occurrences of the entity around the time of the alert, and applies one or more anomaly detection algorithms to identify related anomalies. As a result, an investigation can now be modeled by the following structured flow:

Starting from an alert, extract the entities of the alert
run AL on the entities to identify anomalies on these entities within a time-window around the alert
extract the entities from the raw data related to the anomalies found, and
continue iteratively until either an evidence of a compromise was identified, or it is determined that the scan was sufficiently thorough and the case is most likely a false positive.

Once an alert is verified as a real attack, a mitigation action may be employed. The mitigation action may include cleaning the compromised resources (e.g., removing malicious files), setting protections means (e.g., resetting passwords, changing network configurations) and setting up short-term specific detections of the identified IoCs.

Figure 1B:
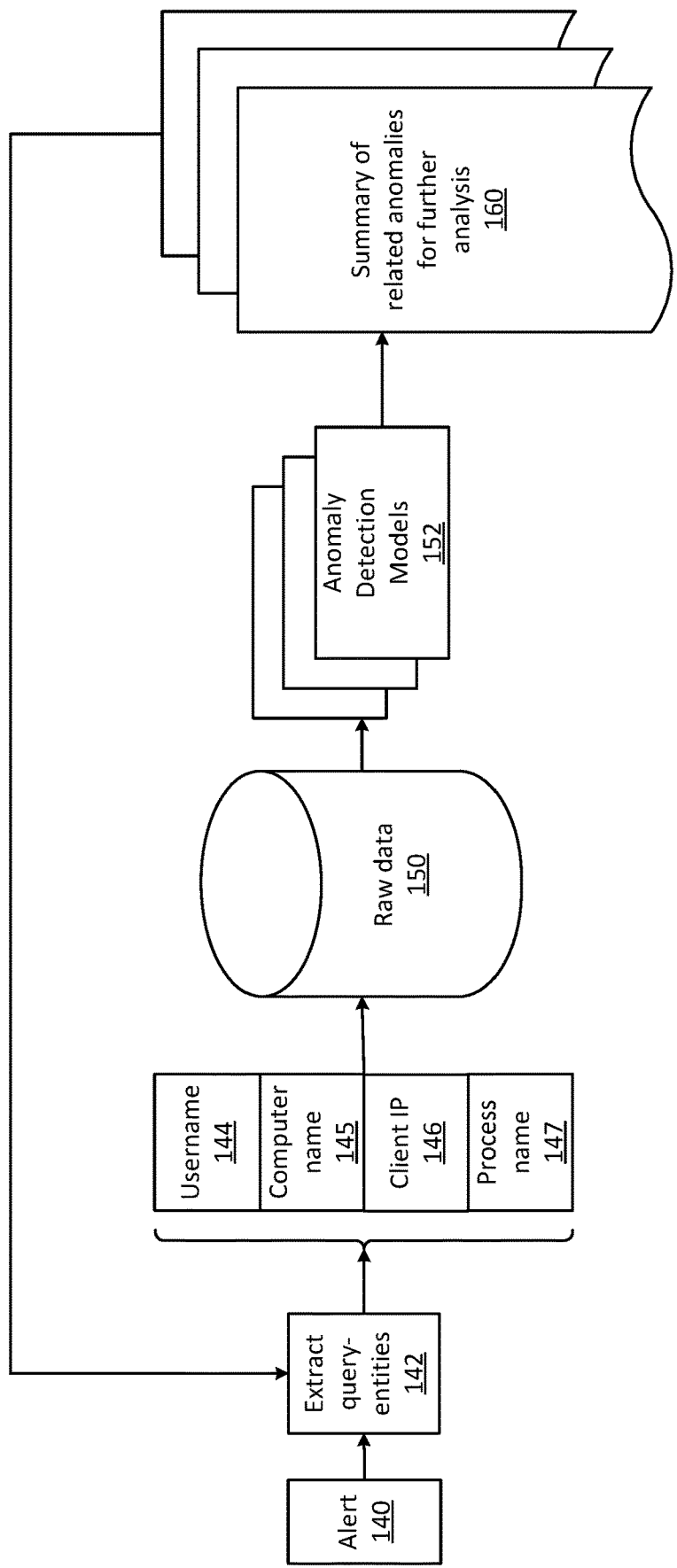
FIG. 1B is a flowchart depicting an example procedure for performing anomaly detection in accordance with the present disclosure.

In one embodiment, the AnomalyLookup (AL) framework follows the flow depicted in FIG. 1B. Starting from an alert, represented as a collection of potentially compromised or malicious entities and the detection timestamp, the algorithm scans through all of the raw data tables, to identify where each entity appears. On these tables, the algorithm applies one or more anomaly detection models, and a detected set of anomalies, together with the raw data records corresponding to the anomalous events, are returned.

Different anomaly detection approaches may be incorporated into this search. In an embodiment, the two algorithms described below may be implemented. Both algorithms search for time-anomalies, hence they apply when the entity has some history in the log table (e.g., minimum of 5 days). The data may be grouped into 1-day bins, and depending on the entity's first occurrence in the table, a window of up to 30 days may be used to model the expected counts on the last day. Anomalies may be detected over the 1-day period starting at the alert. The window period may be modified in various embodiments.

One anomaly detection algorithm searches for time-anomalies over categorical data columns with a finite set of values. The algorithm aims to identify increased counts around the alert of columns such as event-types, operations, etc. Relevant columns for this analysis may be identified based on a heuristic that requires the column to have at most 1000 values and at least 100 times more records.

In one embodiment, the anomaly detection may be performed by two algorithms. In the first algorithm, the mean and distance may be evaluated in standard deviations, which may be referred to herein as the meanStd algorithm. In the second algorithm, a time-series approach may be implemented, taking trend and seasonality into account. For the time-series approach, a time series decomposition model, such as the series_decompose_anomalies function in Azure LogAnalytics, may be used. An anomaly score may be calculated for the entire series, including the last bin using Tukey's fence test with a custom 10th-90th percentile range. Series that have five or more anomalies in the baseline period may be filtered. Anomalies with a score higher than 3 may be reported.

The second anomaly detection algorithm may search for time-anomalies over string data columns with a large set of values. The algorithm aims to identify new entities that appear in the context of the query entity. For example, if the AnomalyLookup's query-entity was a machine, relevant data columns for this type of analysis would be process names, users, or IP addresses that are connected to the machine. Columns may be considered for this analysis if the data type is of type string, and if it has more than 1000 distinct values. The analysis calculates, for each value in the analyzed column (e.g., for each process name), its earliest occurrence and summarizes the counts of new values per time bin. In one example, up to 30 days may be used as a baseline window excluding the last day. The algorithm then splits the baseline window into two parts. The early part of the window is dropped to reduce noise, as it is expected to have more values that are seen for the first time. The later part (e.g., last six days) may be used to evaluate the mean and variance of the number of new entities expected per day. If the variance is at least 10-fold larger than the average, a Poisson distribution may be applied to extract a p-value for the count in the last bin. Otherwise, a normal distribution may be used. The anomaly score reported is the -log 10(p value), with a threshold of 1.5.

Referring to the appended drawings, in which like numerals represent like elements throughout the several FIGURES, aspects of various technologies for detecting anomalies will be described. In the following detailed description, references are made to the accompanying drawings that form a part hereof, and which are shown by way of illustration specific configurations or examples.

FIG. 1A illustrates an example environment 100 in which authorization requests are handled by a system from various requesting devices. As illustrated, one or more devices 110 that are seeking authorization may attempt to gain access to accounts 175 or physical/virtual machines 177 hosted within the network 170. The devices 110 may connect to the network 170 via a gateway 120 which is in communication with the authentication server 130.

The authentication server 130 may be configured to handle the authorization or rejection of login attempts carried in authentication traffic. Although not illustrated, one of skill in the art will appreciate that various servers and intermediaries in a distributed network may be implemented between the devices 110 and the gateway 120 to route a message between the user and the network 170. As will also be appreciated, although some components of the example environment 100 are illustrated singly, in various aspects multiple copies of those components may be deployed, for example, for load balancing purposes, redundancy, or offering multiple services.

The devices 110 are illustrative of various computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, printers, and mainframe computers. The hardware of these computing systems is discussed in greater detail in regard to FIG. 6.

The devices 110 may be accessed locally and/or by a network, which may include the Internet, a Local Area Network (LAN), a private distributed network for an entity (e.g., a company, a university, a government agency), a wireless ad hoc network, a Virtual Private Network (VPN) or other direct data link (e.g., Bluetooth connection, a direct wired link). For example, a malicious party may attempt to access restricted resources which may be done without the knowledge or consent of the devices' owners. In another example, devices 110 may be the computing devices used by a legitimate user seeking to access an account which may make one or more attempts to access the account.

The gateway 120 may be a hardware device, such as a network switch, or a software service that links the devices 110 from the external network (e.g., the Internet) to the authentication server 130 over the network 170 (e.g., an intranet). In various aspects, the gateway device 120 may provide a firewall and may regulate the flow of communications traffic into and out of the local network 170. The gateway 120 may be configured to forward messages to the authentication server 130 from the devices 110 (as well as other devices on the internal network).

The authentication server 130 may receive authorization requests from the devices 110 and determine whether to grant access to accounts served by the network 170. The authentication server 130 may be a physical machine or a virtual machine that handles the authentication requests for the network 170 and acts as a domain controller. The authentication server 130 may use various authentication protocols including, but not limited to, PAP (Password Authentication Protocol), CHAP (Challenge-Handshake Authentication Protocol), EAP (Extensible Authentication Protocol), Kerberos, or an AAA (Authentication, Authorization, Accounting) architecture protocol, to allow a user access to one or more systems within a network 170. Depending on the standards used, the number of protected systems in the network 170 and user account settings, the successful presentation of authentication parameters will grant the devices 110 access to one or more systems safeguarded by the authentication server 130 and at an appropriate permissions level for the associated user.

In an embodiment, the authentication server 130 may execute a detection application 180 that is configured to access network traffic to monitor authentication traffic over the gateway 120 destined for the authentication server 130 to track data and determine whether any of the communications represent an anomaly that should be further investigated or mitigated. In some embodiments, the detection application 180 may be executed on a separate device with unique MAC and IP addresses from the other devices in the network 170 and receive copies of messages that are forwarded to the authentication server 130 from the gateway 120 via the Remote Network Monitoring (RMON) or Switch Monitoring (SMON) specifications, port mirroring, or similar forwarding scheme. In other aspects, the detection application 180 may intercept all network traffic bound for the authentication server 130 (either with the same MAC and IP address or unique addresses) or passively taps and listens to the transmission medium on which the communications are sent to the authentication server 130. In yet other aspects, the detection application 180 may execute on a virtual machine or as a process on the authentication server 130 and may thereby passively share communications received at the application server 130.

Specifically, in the security context, the described methods can be used to detect anomalies in the names of entities (such as usernames, process names, IP addresses, etc.) that are accessing a resource (such as a server or storage account). This may be useful as a potential security alert, since such an entity may signify a new type of access with higher fidelity than simply detecting a new username. For example, such an access attempt may indicate an access via a dormant backdoor, or a new entity being created for persistent access.

As used herein, a domain may be defined as an administrative unit corresponding to a security boundary. Computers in a domain may share physical proximity on a local area network (LAN) or may be located in different geographic parts of the world and communicate over various types of physical connections, including ISDN, fiber, Ethernet, Token Ring, frame relay, satellite, and leased lines, etc. Domain administrators typically create one user account for each user within a domain and the users log on to the domain rather than repeatedly logging on to various individual resources in the domain. In addition, a domain controller may control various aspects of the domain such as individual use of resources on the domain. The users may access resources in the domain subject to user rights, privileges and system-wide policies. There may be predefined (built-in) user groups with sets of assigned user rights and domain administrators may assign user rights by adding a user account to one of the predefined user groups or by creating a new group and assigning specific user rights to that user group. Users who are subsequently added to a user group may automatically gain all user rights assigned to that user group.

In an embodiment, an agent or application 180 (referred to herein as "detection application") may be installed on domain controllers in a domain or other grouping of computing resources. The detection application may be configured to parse network traffic, access data stored in a data store, or otherwise access data to be analyzed for anomaly detection in usernames and other data of interest. The detection application 180 may analyze data in the manner described herein. Based on the analyzed data, the detection application may identify potential anomalies and generate an alert for responsive/mitigation action.

FIG. 1B illustrates an example process for implementing the AnomalyLookup (AL) framework as discussed above. In one embodiment, an alert 140 may be generated indicating a potentially compromised or malicious entity 142 of potential entities including username 144, computer name 145, client IP 146, and process name 147, along with a detection timestamp. The AL algorithm may be executed to scan through the raw data tables 150 during a time window around the timestamp to identify where each entity appears. On the raw data tables the AL framework may apply one or more anomaly detection models 152. A summary 160 of related anomalies, together with the raw data records corresponding to the anomalous events, may be returned. The related anomalies can further be used to continue iteratively with extraction of entities 142 and scanning the data tables 150 until either an evidence of a compromise was identified, or it is determined that the scan was sufficiently thorough and the case is most likely a false positive.

Figure 2:
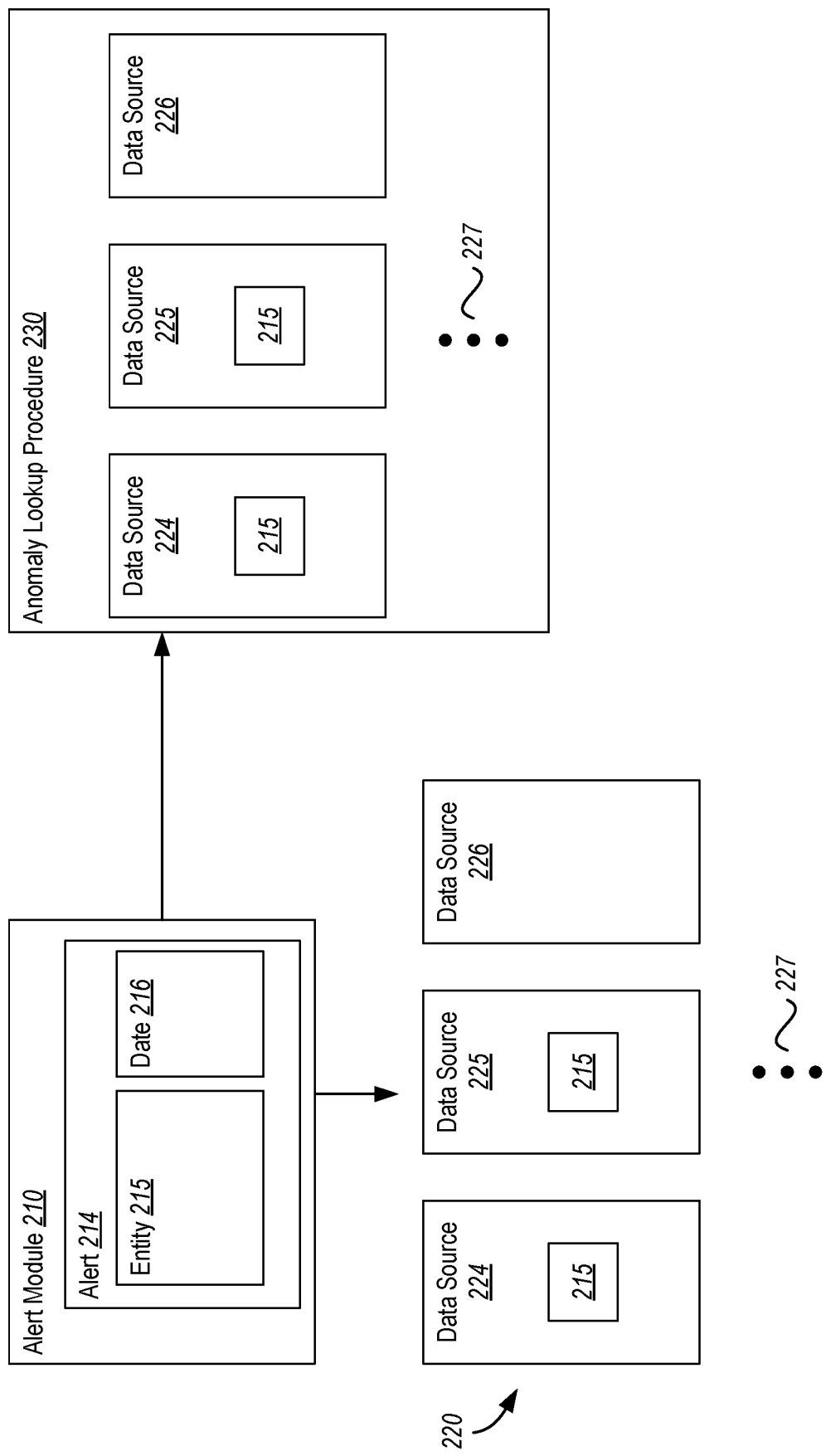
FIG. 2 illustrates an example environment for performing anomaly detection in a computing system.

FIG. 2 illustrates an environment 200 of a computing system. As illustrated, environment 200 includes an alert module 210 and various data sources 220, including data source 224, 225, 226, and any number of additional data sources as illustrated by ellipses 227. In some embodiments, the data sources 220 may include, but are not limited to, logs from one or more of a specific computer, routers on a network, an application, an operating system, network infrastructure, and cloud computing infrastructure. That is, during operation various elements of a computing system such as individual computers and like devices, operating systems and applications running on the computers, network infrastructure such as routers and the like, and cloud computing infrastructure all generate logs of their operations. It will be appreciated that additional computing system elements may also generate logs as needed.

The alert module 210, which may be part of a computing system that is different from those hosting the various data sources, may be configured in operation to generate an alert 214 when an anomaly of some sort is detected in one or more of the data sources 220 or is detected in some other reasonable way known to those of skill in the art. An anomaly may be considered a behavior or action by an entity (i.e., entity 215) that is outside of an expected behavior or action of the entity. An anomaly may include random operational occurrences that does not normally occur, such as a power surge or the like, that are generally not malicious in nature as they are not indicative of any bad intent by the entity that generates the anomaly. An anomaly may also include a malicious activity such as a brute force attack to overwhelm the security protections of the computing system, an attempt to fraudulently impersonate an entity, or an attempt to fraudulently make a purchase. These types of anomalies are malicious in nature as they are indicative of a bad intent against the computing system by the entity that generates the anomaly. In any event, the anomaly may cause the alert module to generate the alert 214.

An entity 215 may be associated with the alert 214. The entity 215 may identify a source of the anomaly that caused the alert to be generated. For example, the entity 215 (and all other entities discussed herein) may be, but is not limited to, a machine or computer name, a user name, an IP address, or a network identifier that identifies the source of the anomaly. If the entity 215 is a machine or computer name or a username, than this may specify that the anomaly was generated by or otherwise associated with that machine or computer or that specific user. Likewise, if the entity 215 is an IP address or a network identifier, then this may specify that the anomaly was generated by or otherwise associated with the specific IP address or network. Although only illustrated as including one entity 215, the alert 214 may include more than one entity 215 as circumstance warrant. A date 216 that may also include a time stamp that specifies the date and time of the anomaly may also be associated with the alert 214.

The environment 200 may also include an anomaly detection procedure 230. The anomaly detection procedure 230 may be a an anomaly detection method as described herein, or any reasonable anomaly detection procedure such as various machine learning algorithms, timeline anomaly detection algorithms, and the like that are able to detect anomalies in the data sources. In operation, the anomaly detection procedure 230 may perform its given anomaly detection on the data sources 220 to determine if the anomaly or additional anomalies associated with the entity 215 may have occurred in one or more of the data sources 220 around the date and time specified by the date 216. This information may then be used to initiate corrective actions if the detected anomalies are indicative of malicious activity or if it is otherwise deemed that corrective actions would be beneficial.

As shown in FIG. 2, the anomaly detection procedure 230 performs its anomaly detection on all of the data sources 220. However, as also shown, only the data sources 224 and 225 include data that includes or is otherwise associated with the entity 215. The data source 226 and any potential data sources 227 do not include data that is associated with the entity 215. Accordingly, the anomaly detection procedure 230 may perform the anomaly detection on many data sources that will not provide any information as to anomalies associated with the entity 215.

Figure 3:
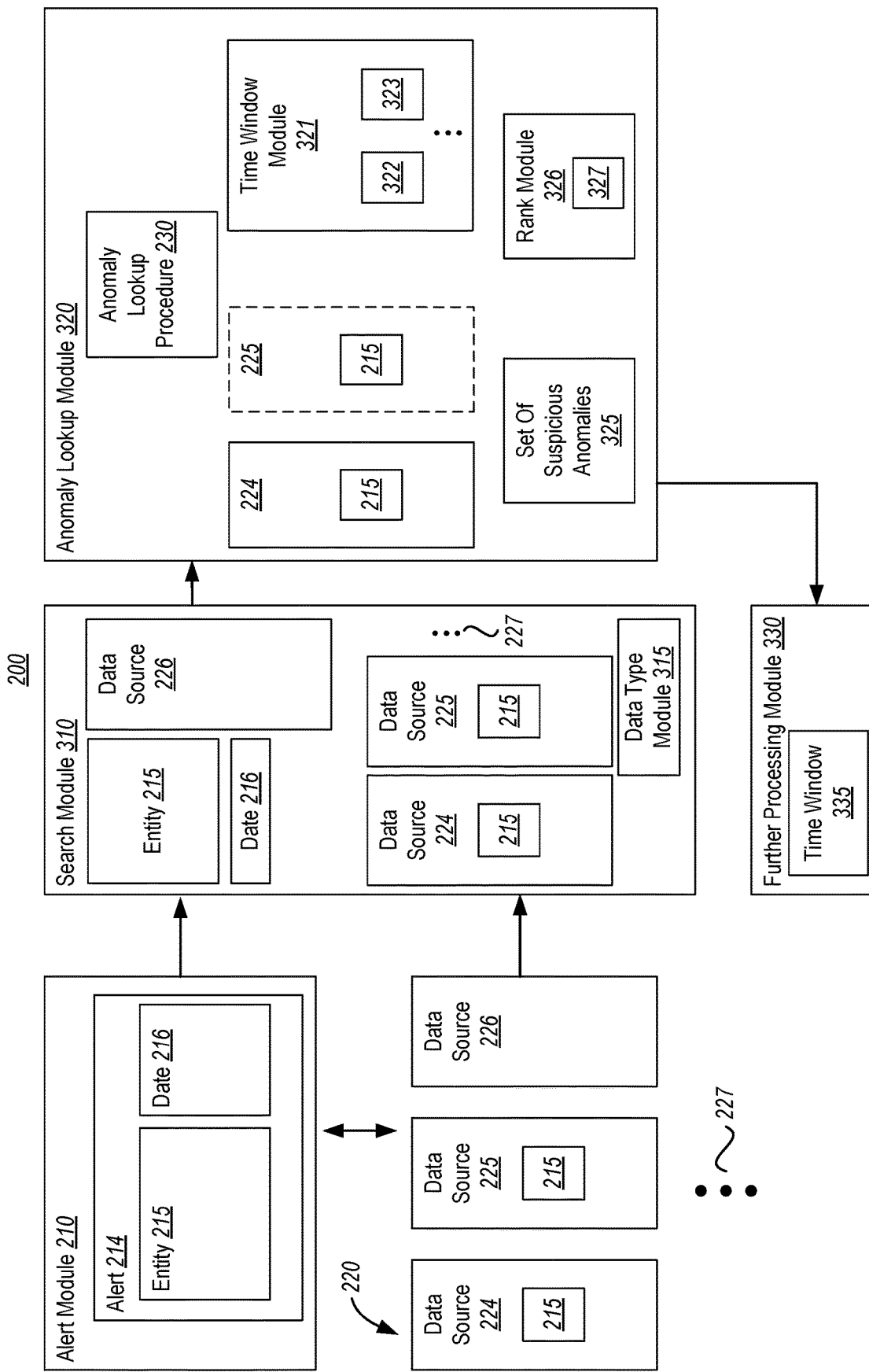
FIG. 3 illustrates an example environment for performing anomaly detection according to the embodiments disclosed herein.

FIG. 3 illustrates an environment 300 of a computing system. It should be appreciated that the environment 300 is only one of many possible environments and thus is not to be used to limit the embodiments disclosed herein. The environment 300 may correspond to the environment 200 and thus may include some of the elements of the environment 200. For example, as illustrated, environment 300 includes the alert module 210 and the alert 214 with its associated entity 215 and date 216. In addition, environment 300 includes the various data sources 220 including data sources 224, 225, 226, and potentially any number of additional data sources represented by the ellipses 227. Accordingly, these elements need not be explained in further detail.

The environment 300 may include a search module 310. In operation, the search module 310 may receive or otherwise access the entity 215 and the date 216 from the alert 214. The search module 310 may also access the various data sources 220. The search module 310 may then search all of the data sources 220 to determine which of the data sources includes data that includes or is otherwise associated with the entity 215 that was logged around the date 216. In this way, the search module 310 is able to determine only those data sources that are associated with the entity 215 for further anomaly detection procedures as will be explained in more detail to follow.

The environment 300 may further include an anomaly detection module 320 that may include the anomaly detection procedure 230 that performs anomaly detection on the data sources 220. As illustrated in FIG. 3, only the data sources 224 and 225 that include or are otherwise associated with the entity 215 are provided to the anomaly detection module 320 for anomaly detection analysis by the anomaly detection procedure 230. Accordingly, the embodiments disclosed herein eliminate the need for the anomaly detection on those data sources 220 (i.e., data sources 226 and 227) that do not include the entity 215.

During the anomaly detection, the anomaly detection procedure 230 may perform anomaly detection on the data sources 224 and 225 during a first time window to determine an initial set of potential or suspicious anomalies. Accordingly, the anomaly detection module 320 may include a time window module 321 that is able to specify a time window 322. In some embodiments, the time window 322 may be set to a relatively short period of time, such as a day or less, although any desired time period may be used as circumstances require. As may be appreciated, setting the time window 322 to a relatively short period of time allows the anomaly detection to establish a baseline that can then be used to determine if the anomalies are regularly occurring, which may be indicative of a malicious anomaly, or are random occurrences that are indicative of a random, non-malicious anomaly.

The anomaly detection procedure 230 may then determine an initial set of suspicious anomalies 325 found during the time window 322. In the embodiments disclosed herein, the term "suspicious" is used to indicate that the anomalies that are found are such that further analysis may be warranted to determine if they are malicious or not. Thus, the set of suspicious anomalies may ultimately be determined to be malicious, to be non-malicious, or to include a combination of both malicious and non-malicious anomalies as will be explained in more detail to follow.

In some embodiments, the anomaly detection procedure 230 may also utilize an additional time window 323 that is specified by the time window module 320. In some embodiments, the time window 323 may be longer than the time window 322. This allows for a comparison between the anomalies found during the time window 322 with those found during the time window 321 when determining the initial set of suspicious anomalies 325.

As mentioned previously, the anomaly detection procedure 230 may implement one or more of the algorithms described herein. In some embodiments, the anomaly detection procedure 230 may additionally or alternatively incorporate various types of anomaly detection procedures including various types of machine learning algorithms, timeline anomaly detection algorithms, and the like. Advantageously, the embodiments disclosed herein can function with all types of anomaly detection procedures. That is, the search module 310 is able to search and determine those data sources 220 that include or are otherwise associated with the entity 215 without regard to the specific type of the anomaly detection procedure 230.

In some embodiments, further anomaly detection may be desired on the initial set of suspicious anomalies 325. Accordingly, in such embodiments the environment 300 may include a further processing module 330. Although shown as being separate, in some embodiments the further processing module 330 may be part of the anomaly detection module 320.

In operation, the further processing module 330 may be configured to perform further analysis on the initial set of suspicious anomalies 325 to determine additional information about the anomalies. In one embodiment, this may include having the anomaly detection procedure 230 perform anomaly detection over a longer time window than the time window 322 and the time window 323 in those embodiments that utilize the time window 323. Accordingly, the further processing module 330 may include a time window module (not illustrated) or have access to the time module 321 that is able to specify a time window 335. As mentioned, the time window 335 may be a longer time period than the time windows 322 and 323.

Figure 4:
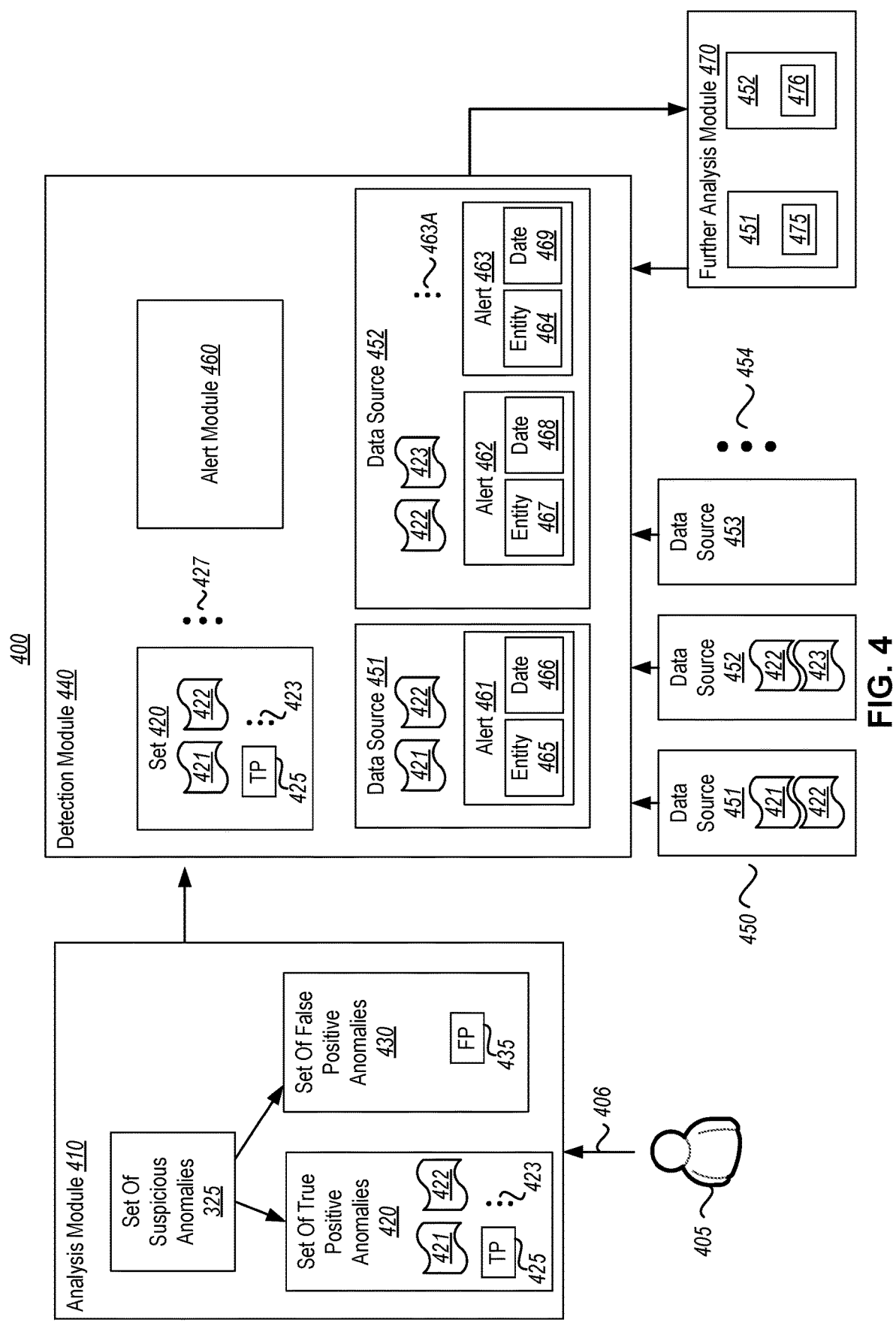
FIG. 4 illustrates an example environment for using anomalies indicative of malicious behavior according to the embodiments disclosed herein.

FIG. 4 illustrates an environment 400 of a computing system. It will be noted that the environment 400 is only one of many possible environments and thus is not to be used to limit the embodiments disclosed herein. The environment 400 may correspond to the environments 200 and 300 and thus may include some of the elements of the environment 200 and 300. Accordingly, any previously described elements need not be described in particular detail in relation to environment 400.

The environment 400 may include an analysis module 410. In operation, the analysis module 410 may receive or otherwise access the set of suspicious anomalies 325 that were detected in the manner previously described. A human investigator 405 may then analyze the set of suspicious anomalies 325 to determine if the detected anomalies included in the set of suspicious anomalies 325 are in fact indicative of a malicious behavior on the part of the entity 215. In other words, the investigator 405 may determine if the various anomalies are a "true positive" or a "false positive" as denoted at 406. An anomaly that is a true positive is one that is indicative of a malicious pattern of behavior on the part of the entity 215. In contrast, an anomaly that is a false positive is one that was found to not be indicative of a malicious pattern of behavior on the part of the entity 215. It will be noted that in some embodiments, the investigator 405 may be a non-human investigator.

As shown in FIG. 4, the anomalies that are determined to be true positives may be grouped into a set of true positive anomalies 420. The set of true positive anomalies 420 may include an anomaly 421, an anomaly 422, and any number of additional anomalies as illustrated by the ellipses 423. As discussed above, the set of true positive anomalies 420 include anomalies that are indicative of a malicious pattern of behavior.

In some embodiments, the set of true positive anomalies 420 may be generated in a predefined structured format. For example, the set of true positive anomalies 420 may include standard rows, columns, data formats and types, and the like that are useable by a detection module 440 or some other element of the computing system 400. The use of a structured format may help ensure that the set of true positive anomalies 420 has the same format as a set of true positive anomalies that are determined by an investigator other than the investigator 405. This may help ensure that the detection module 440 or some other element of the computing system 400 is able to easily and efficiently use the set of true positive anomalies 420 to automatically generate new alerts as will be explained in more detail to follow. As also illustrated, the investigator 405 may label the set of true positive anomalies 420 as being true positive as denoted at 425. It will be appreciated that the label 425 of "true positive" is only one example of the many ways that the investigator 405 may indicate that the set of true positive anomalies 420 are anomalies that should be used to in a further process to automatically generate the new alerts.

The anomalies that are determined to be false positives may be grouped into a set of false positive anomalies 430. The set of false positive anomalies 430 may include any number of anomalies as circumstances warrant. The set of false positive anomalies 430 may be labeled by the investigator 405 as being false positive as denoted at 435. It will be appreciated that the label 435 of "false positive" is only one example of the many ways that the investigator 405 may indicate that the set of false positive anomalies 430 are anomalies that should not be used in any further process to automatically generate the new alerts.

The environment 400 may include the detection module 440. In operation, the detection module 440 may receive or otherwise access from the analysis module 410 the set of true positive anomalies 420 that has been labeled by the investigator 405. Although the following discussion will focus on the set of true positive anomalies 420, the ellipses 427 represent that the detection module 440 may receive additional sets of true positive anomalies from the analysis module 410 or from other (not illustrated) analysis modules that have been used by various investigators who are similar to the investigator 405 to determine the sets of true positive anomalies.

As discussed previously, the anomalies 421, 422, and 423 of the set of true positive anomalies 420 are indicative of patterns of malicious behaviors. Accordingly, these anomalies may be used to help automatically generate new alerts for additional entities that may exhibit similar patterns of malicious behavior as the entity 215. Advantageously, this allows for the computing system to automatically determine additional detection leads that may be further evaluated to determine if they are true positive anomalies. It will be noted that an alert as used herein may be considered a detection lead as the generation of an alert may lead to further evaluation of an anomalies that caused the alert to be generated.

As illustrated, the environment 400 may include various data sources 450, including data source 451, 452, 453, and any number of additional data sources as illustrated by ellipses 454. In some embodiments, the data sources 450 may correspond to the data sources 220 and thus may include, but are not limited to, logs from one or more of a specific computer, routers on a network, an application, an operating system, network infrastructure, and cloud computing infrastructure.

The detection module 440 may receive or otherwise access the various data sources 450. The detection module 440 may then search each of the data sources 450 to determine if the data sources include data including one or more of the anomalies 421, 422, and 423. As illustrated, the data source 451 includes data including the anomalies 421 and 422 and the data source 452 includes data including the anomalies 422 and 423. However, the data sources 453 and 454 do not include data including any of the anomalies 421, 422, and 423 and so further action is not performed on the data sources 453 and 454.

The detection module 440 may include an alert module 460, which may correspond to the alert module 220 or which may be a separate alert module. In operation, the alert module 460 may generate an alert when any portion of the data included in the data sources includes one or more of the anomalies 421, 422, and 423. For example, the alert module 460 may generate an alert 461 for the data source 451 since the data source 451 includes data including the combination of the anomalies 421 and 422. In some embodiments, the alert 461 may indicate an entity 465 that performed the pattern of behavior associated with the anomalies 421 and 422. The alert 461 may also include a date and/or time stamp 466 that indicate when the anomalous behavior occurred.

Likewise, the alert module 460 may generate an alert 462 for the data source 452 since the data source 453 includes data including the combination of the anomalies 422 and 423. The alert 462 may indicate an entity 467 that performed the pattern of behavior associated with the anomalies 422 and 423. The alert 461 may also include a date and/or time stamp 468 that indicate when the anomalous behavior occurred.

In some embodiments, the alert module 460 may generate more than one alert for a given data source. Accordingly, as illustrated the alert module 460 may also generate an additional alert 463 for the data source 452 for the combination of the anomalies 422 and 423. The alert 463 may indicate an additional entity 464 that also performed the pattern of behavior associated with the anomalies 422 and 423. The alert 461 may also include a date and/or time stamp 469 that indicate when the anomalous behavior occurred. Accordingly, the alert module 460 is able to generate any number of alerts as circumstances warrant as illustrated by the ellipses 463A. Indeed, in many instances a large number of alerts may be generated for a given combination of true positive anomalies.

Accordingly, since the anomalies 421 and 422 are indicative of a malicious pattern of behavior and the entity 465 performed similar behaviors so as to cause the detection of these anomalies, it is likely that the entity 465 is also engaged in malicious behavior. Likewise, since the anomalies 422 and 423 are indicative of a malicious pattern of behavior and the entities 464 and 467 performed similar behaviors so as to cause the detection of these anomalies, it is likely that the entities 464 and 467 are also engaged in malicious behavior. Accordingly, the use of the anomalies 421, 422, and 423 resulted in the detection of additional malicious behavior.

As may be noted, the human investigator 405 and any other similar human investigators may only be able to identify and label a relatively small number of detected anomalies as being "true positive" anomalies. Advantageously, by using the combination of anomalies that have been labeled as being true positives (i.e., showing the pattern of behavior indicative of a malicious activity), the embodiments disclosed herein allow for all (or at least a substantial amount) of the data sources 450 to have alerts generated when the data sources include the combination of anomalies. This in turn provides for a larger number of detection leads that can then be evaluated to determine if the detection lead are themselves valuable to use as future detection leads.

Accordingly, in some embodiments the environment 400 may include a further analysis module 470. In operation, the further analysis module 470 may receive or otherwise access the data sources 451 and 452 that have had the alerts 461, 462, and 463 generated as previously described. An investigator, who may be the human investigator 405, some other human investigator, or some non-human investigator may then evaluate the alerts 461, 462, and 463 and their associated anomalies to see if the combination of the anomalies are themselves valuable to use as the future detection leads.

For example, if the evaluation shows that the combination of the anomalies 421 and 422 that led to the generation of the alert 461 causes a sufficient enough detection of true positive anomalies, then this combination may automatically be used by the detection module 440 in future searches of the data sources 450 to determine if the data sources include the combination of the anomalies. In such case, the combination of the anomalies 421 and 422 may be labeled as "true positive" 475 or some other indicator that the combination should be used in the future detection by the detection module 440. In contrast, if the evaluation shows that the combination of the anomalies 421 and 422 does not cause a sufficient enough detection of true positive anomalies, then the combination may be labeled as "false positive" 475 and discarded for future detection by the detection module.

In similar manner, if the evaluation shows that the combination of the anomalies 422 and 423 that led to the generation of the alerts 462 and 463 causes a sufficient enough detection of true positive anomalies, then this combination may also automatically be used by the detection module 440 in future searches of the data sources 450 to determine if the data sources include this combination of the anomalies. In such case, the combination of the anomalies 422 and 423 may be labeled as "true positive" 476 or some other indicator that the combination should be used in the future detection by the detection module 440. In contrast, if the evaluation shows that the combination of the anomalies 422 and 423 does not cause a sufficient enough detection of true positive anomalies, then the combination may be labeled as "false positive" 476 and discarded for future detection by the detection module.

Figure 5:
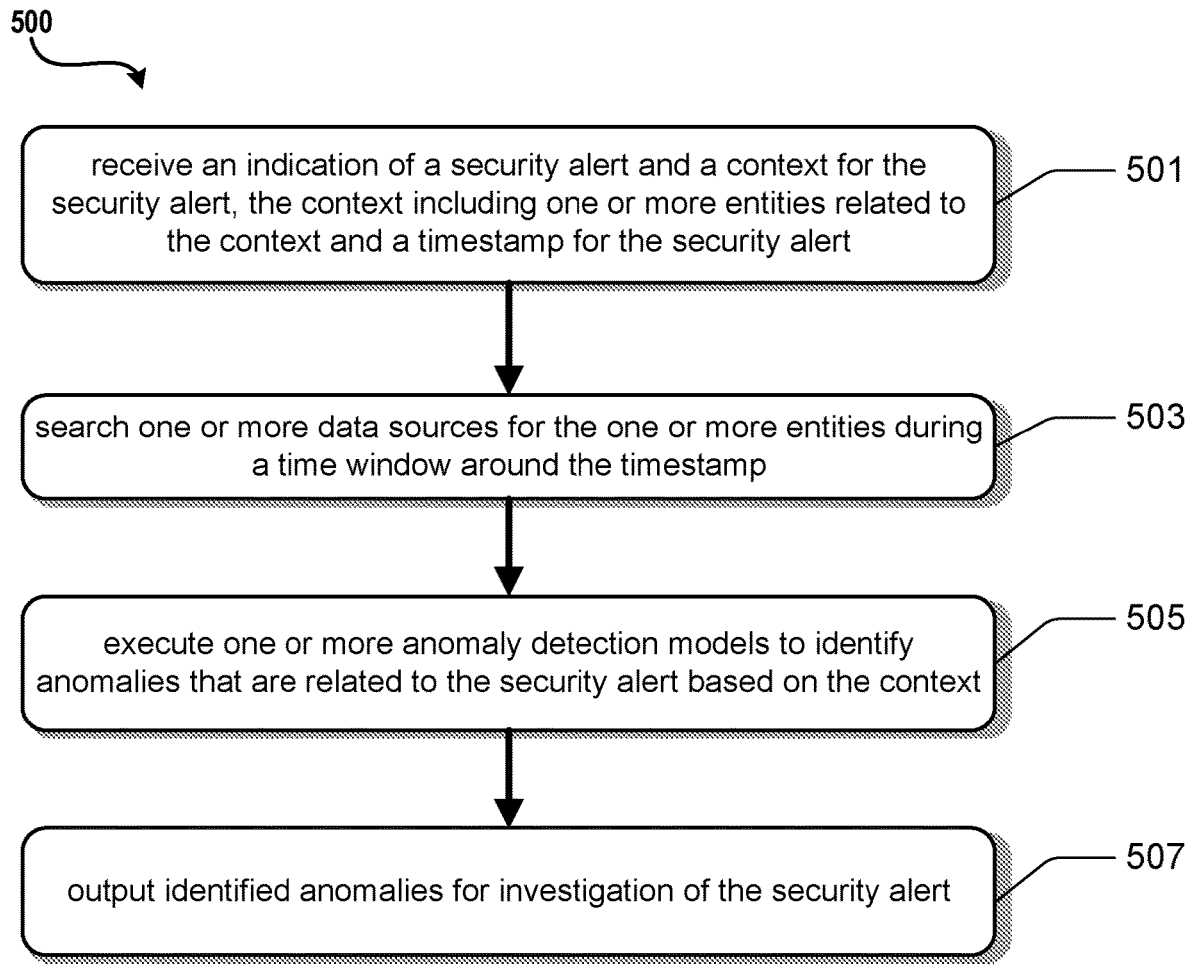
FIG. 5 is a flowchart depicting an example procedure for performing anomaly detection on data sources that include an entity related to an alert in accordance with the present disclosure.

Turning now to FIG. 5, illustrated is an example operational procedure for performing anomaly detection on data sources that include an entity related to an alert in accordance with the present disclosure. The operational procedure may be implemented in a system comprising one or more computing devices.

It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a computing device, it can be appreciated that this routine can be performed on any computing system which may include a number of computers working in concert to perform the operations disclosed herein.

Thus, it should be appreciated that the logical operations described herein are implemented (1) as a sequence of computer implemented acts or program modules running on a computing system such as those described herein and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Referring to FIG. 5, operation 501 illustrates receiving an indication of a security alert and a context for the security alert. In an embodiment, the context includes one or more entities related to the context and a timestamp for the security alert.

Operation 501 may be followed by operation 503. Operation 503 illustrates searching one or more data sources for the one or more entities during a time window around the timestamp.

Operation 503 may be followed by operation 505. Operation 505 illustrates executing one or more anomaly detection models to identify anomalies that are related to the security alert based on the context.

Operation 505 may be followed by operation 507. Operation 507 illustrates outputting identified anomalies for investigation of the security alert.

In an embodiment, data at the data sources are grouped into one-day bins, and anomalies are detected for a one day period starting at the timestamp.

In an embodiment, the one or more entities comprise one or more of a machine name, a username, an IP address, a process name, or a network identifier.

In an embodiment, the anomaly detection model comprises evaluating mean and distance in standard deviations.

In an embodiment, the anomaly detection model comprises a time series decomposition model.

In an embodiment, an anomaly score is calculated for the series including the last bin using Tukey's fence test with a custom 10th-90th percentile range.

In an embodiment, series that have five or more anomalies in a baseline period are filtered and anomalies with a score higher than 3 are reported.

In an embodiment, the anomaly detection model comprises: calculating, for each value in groupings of data for the one or more entities, an earliest occurrence and summarizing counts of new values per time bin;
determining a baseline window excluding the last day; and
splitting the baseline window to two parts, an earlier part being dropped to reduce noise, and a later part being used to evaluate mean and variance of a number of new entities expected per day.

In an embodiment, when the variance is at least 10-fold larger than the average, a Poisson distribution is applied to extract a p-value for the count in the last bin, and otherwise a normal distribution is used.

In an embodiment, the anomaly score as the -log 10(p value) is reported, with a threshold of 1.5.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems. The embodiments described herein may also be practiced in distributed computing environments, where tasks are performed by remote processing devices that are linked through a communications network. In a distributed computing environment, program modules may be located in both local and remote memory storage devices.

Networks established by or on behalf of a user to provide one or more services (such as various types of cloud-based computing or storage) accessible via the Internet and/or other networks to a distributed set of clients may be referred to as a service provider. Such a network may include one or more data centers such as data center 300 illustrated in FIG. 3, which are configured to host physical and/or virtualized computer servers, storage devices, networking equipment and the like, that may be used to implement and distribute the infrastructure and services offered by the service provider.

Figure 6:
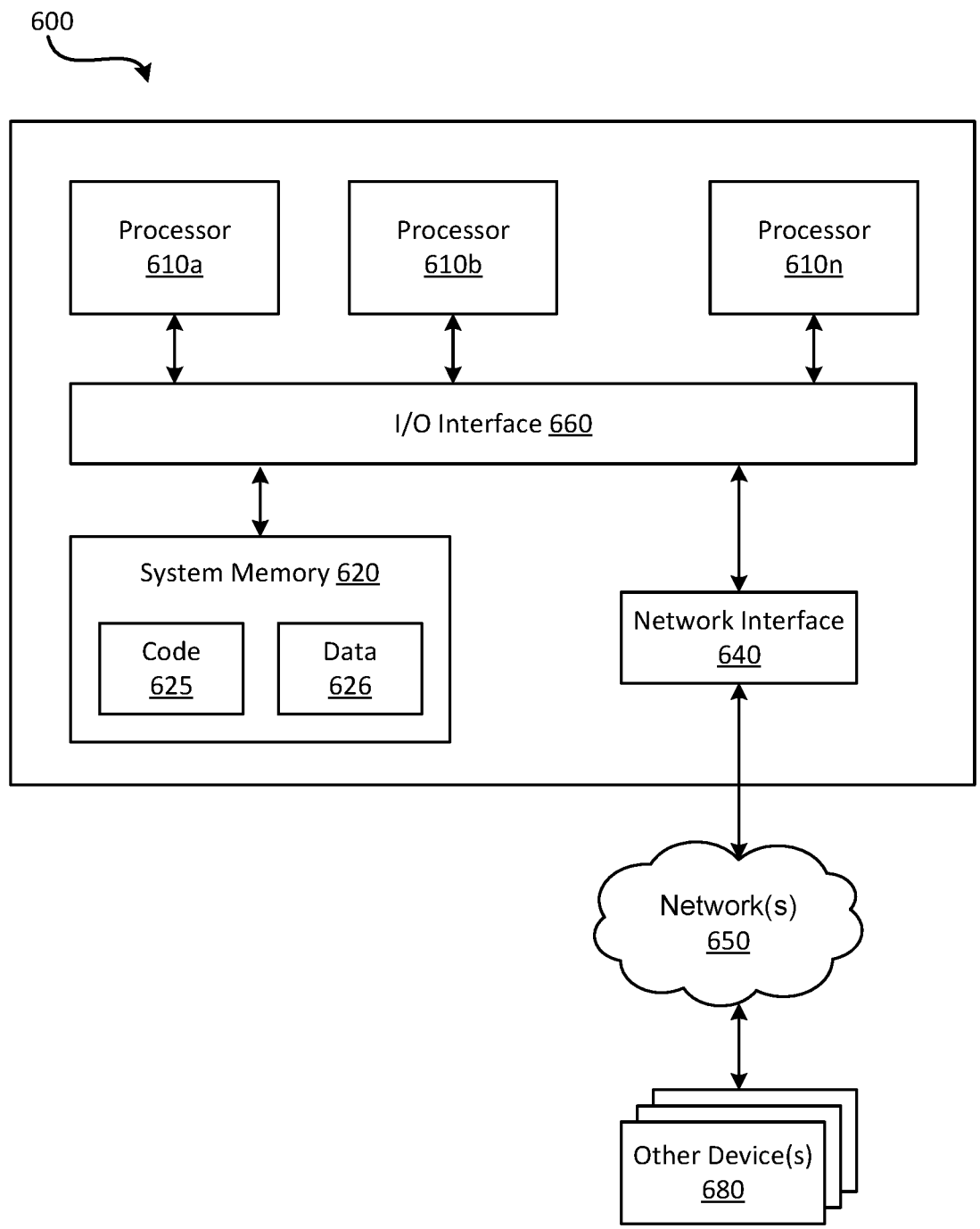
FIG. 6 is an example computing device in accordance with the present disclosure.

In some embodiments, a computing device that implements a portion or all of one or more of the technologies described herein, including the techniques to implement the detection of unauthorized use of user credentials in a network implementing an authentication protocol may include a general-purpose computer system that includes or is configured to access one or more computer-accessible media. FIG. 6 illustrates such a general-purpose computing device 600. In the illustrated embodiment, computing device 600 includes one or more processors 610*a*, 610*b*, and/or 610*n* (which may be referred herein singularly as "a processor 610" or in the plural as "the processors 610") coupled to a system memory 620 via an input/output (I/O) interface 630. Computing device 600 further includes a network interface 640 coupled to I/O interface 630.

In various embodiments, computing device 600 may be a uniprocessor system including one processor 610 or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x66, PowerPC, SPARC, or MIPS ISAs, or any other suitable ISA. In multiprocessor systems, each of processors 610 may commonly, but not necessarily, implement the same ISA.

System memory 620 may be configured to store instructions and data accessible by processor(s) 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 620 as code 625 and data 626.

In one embodiment, I/O interface 630 may be configured to coordinate I/O traffic between the processor 610, system memory 620, and any peripheral devices in the device, including network interface 640 or other peripheral interfaces. In some embodiments, I/O interface 630 may perform any necessary protocol, timing, or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components. Also, in some embodiments some or all of the functionality of I/O interface 630, such as an interface to system memory 620, may be incorporated directly into processor 610.

Network interface 640 may be configured to allow data to be exchanged between computing device 600 and other device or devices 680 attached to a network or network(s) 650, such as other computer systems or devices as illustrated in FIGS. 1 through 4, for example. In various embodiments, network interface 640 may support communication via any suitable wired or wireless general data networks, such as types of Ethernet networks, for example. Additionally, network interface 640 may support communication via telecommunications/telephony networks such as analog voice networks or digital fiber communications networks, via storage area networks such as Fibre Channel SANs or via any other suitable type of network and/or protocol.

In some embodiments, system memory 620 may be one embodiment of a computer-accessible medium configured to store program instructions and data as described above for FIGS. 1-5 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 600 via I/O interface 630. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 600 as system memory 620 or another type of memory. Further, a computer-accessible medium may include transmission media or signals such as electrical, electromagnetic or digital signals, conveyed via a communication medium such as a network and/or a wireless link, such as may be implemented via network interface 640. Portions or all of multiple computing devices, such as those illustrated in FIG. 6, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 6, may include other components that are not explicitly shown in FIG. 6, or may utilize an architecture completely different than that shown in FIG. 6.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computing system comprising:
   one or more processors; and
   one or more computer-readable media having thereon computer-executable instructions that are structured such that, when executed by the one or more processors, cause the computing system to:
   receive an indication of a security alert and a context for the security alert, the context including an entity related to the context and a timestamp for the security alert;
   search a data source for the entity during a time window around the timestamp;
   execute an anomaly detection model to identify anomalies that are related to the security alert based on the context, wherein the anomaly detection model comprises:
   calculate, for values in groupings of data for the entity, an earliest occurrence and summarizing counts of new values per time bin;
   determine a baseline window excluding a last time bin; and
   split the baseline window to two parts, a first part being dropped to reduce noise, and a second part being used to evaluate mean and variance of a number of new entities expected per time bin; and
   output the identified anomalies for investigation of the security.

2. The computing system of claim 1, further comprising computer-executable instructions that are structured such that, when executed by the one or more processors, cause the computing system to send an indication that the security alert is likely a false positive when no anomalies are identified.

3. The computing system of claim 1, wherein data at the data sources are grouped into one-day bins, and anomalies are detected for a one-day period.

4. The computing system of claim 1, wherein the one or more entities comprise one or more of a machine name, a username, an IP address, a process name, or a network identifier.

5. The computing system of claim 1, wherein the anomaly detection model comprises evaluating mean and distance in standard deviations.

6. The computing system of claim 1, wherein the anomaly detection model comprises a time series decomposition model.

7. The computing system of claim 6, further comprising computer-executable instructions that are structured such that, when executed by the one or more processors, cause the computing system to calculate an anomaly score for the series including the last time bin using Tukey's fence test with a custom 10th-90th percentile range.

8. The computing system of claim 7, wherein series that have five or more anomalies in a baseline time window are filtered and anomalies with a score higher than 3 are reported.

9. The computing system of claim 1, wherein when the variance is at least 10-fold larger than the average, a Poisson distribution is applied to extract a p-value for the count in the last bin, and otherwise a normal distribution is used.

10. The computing system of claim 9, further comprising computer-executable instructions that are structured such that, when executed by the one or more processors, cause the computing system to report the anomaly score as the -log 10(p value), with a threshold of 1.5.

11. A method for performing anomaly detection on data sources that include an entity related to an alert, the method comprising:
   receiving an indication of a security alert and a context for the security alert, the context including an entity related to the context and a timestamp for the security alert;
   searching a data source for the entity during a time window around the timestamp;
   executing an anomaly detection model to identify anomalies that are related to the security alert based on the context, wherein the anomaly detection model comprises:
   calculating, for values in groupings of data for the entity, an earliest occurrence and summarizing counts of new values per time bin;
   determining a baseline window excluding a last time bin; and
   splitting the baseline window to two parts, a first part being dropped to reduce noise, and a second part being used to evaluate mean and variance of a number of new entities expected per time bin; and
   outputting the identified anomalies for investigation of the security alert.

12. The method of claim 11, further comprising sending an indication that the security alert is likely a false positive when no anomalies are identified.

13. The method of claim 11, wherein data at the data sources are grouped into one-day bins, and anomalies are detected for a one day period starting at the timestamp.

14. The method of claim 11, wherein the one or more entities comprise one or more of a machine name, a username, an IP address, a process name, or a network identifier.

15. The method of claim 11, wherein the anomaly detection model comprises evaluating mean and distance in standard deviations.

16. The method of claim 11, wherein the anomaly detection model comprises a time series decomposition model.

17. The method of claim 16, further comprising calculating an anomaly score for the series including the last bin using Tukey's fence test with a custom 10th-90th percentile range, wherein series that have five or more anomalies in a baseline period are filtered and anomalies with a score higher than 3 are reported.

18. The method of claim 11, wherein the anomaly detection model comprises:
   calculating, for each value in groupings of data for the one or more entities, an earliest occurrence and summarizing counts of new values per time bin;
   determining a baseline window excluding the last day; and
   splitting the baseline window to two parts, an earlier part being dropped to reduce noise, and a later part being used to evaluate mean and variance of a number of new entities expected per day.

19. A computer program product comprising one or more computer-readable storage media having thereon computer-executable instructions that are structured such that, when executed by one or more processors of a computing system, cause the computing system to perform operations comprising:
   receiving an indication of a security alert and a context for the security alert, the context including an entity related to the context and a timestamp for the security alert;
   searching a data source for the entity during a time window around the timestamp;

executing an anomaly detection model to identify anomalies that are related to the security alert based on the context, wherein the anomaly detection model comprises:
calculating, for values in groupings of data for the entity, an earliest occurrence and summarizing counts of new values per time bin;
determining a baseline window excluding a last time bin; and
splitting the baseline window to two parts, a first part being dropped to reduce noise, and a second part being used to evaluate mean and variance of a number of new entities expected per time bin; and
outputting the identified anomalies for investigation of the security alert.

* * * * *